Jan. 26, 1937.   J H. HUNT ET AL   2,069,071
BRAKE DRUM
Filed July 18, 1931   3 Sheets-Sheet 1

Inventors:
J. Harold Hunt +
Andrew S. Van Halteren

Jan. 26, 1937.  J H. HUNT ET AL  2,069,071
BRAKE DRUM
Filed July 18, 1931  3 Sheets-Sheet 2

Inventors:
J Harold Hunt +
Andrew S. Van Hatteren
By Cromwell, Greist & Warden
Attys Jan. 26, 1937.                J H. HUNT ET AL                2,069,071
                                 BRAKE DRUM
                           Filed July 18, 1931           3 Sheets-Sheet 3

Inventors:
J Harold Hunt &
Andrew S. Van Halteren
By: Cromwell, Greist & Warden
           Attys Patented Jan. 26, 1937

2,069,071

UNITED STATES PATENT OFFICE 2,069,071

BRAKE DRUM

J Harold Hunt, Lansing, and Andrew S. Van Halteren, East Lansing, Mich., assignors to Motor Wheel Corporation, Lansing, Mich., a corporation of Michigan Application July 18, 1931, Serial No. 551,682

8 Claims. (Cl. 188—218)

This invention relates to drums, and is illustrated as embodied in several forms of drums suitable for automobile brakes, although the invention in some phases is also capable of use in drums for other purposes.

An object of the invention is to provide a composite drum, built up of sections preferably riveted or welded or otherwise permanently secured together, so that each section may be made of a material best adapted for the work of that particular section. We particularly wish to use a good braking metal such as cast iron, for engagement with the brake friction means, without sacrificing the combination of lightness and great strength afforded by the use of a material such as sheet steel in the body part of the drum.

In some of the embodiments illustrated, the body of the drum is built up of two sections, one of which is preferably formed with the head for mounting the drum, and which are permanently secured together with a liner of cast iron or other good braking metal seated within the sections and bridging the joint between them. We prefer to secure the sections together by riveting or welding together side flanges formed therein, the flanges when so secured together forming in effect a heat-radiating and strengthening rib at the center of the drum. The heat-radiating effect of this rib may be intensified by providing the liner with a part secured between said flanges and forming a part of the composite rib.

In other embodiments, the cast iron or equivalent material forms a brake flange ring all in one piece, and which is secured to a novel head of sheet steel or the like.

Figure 1:
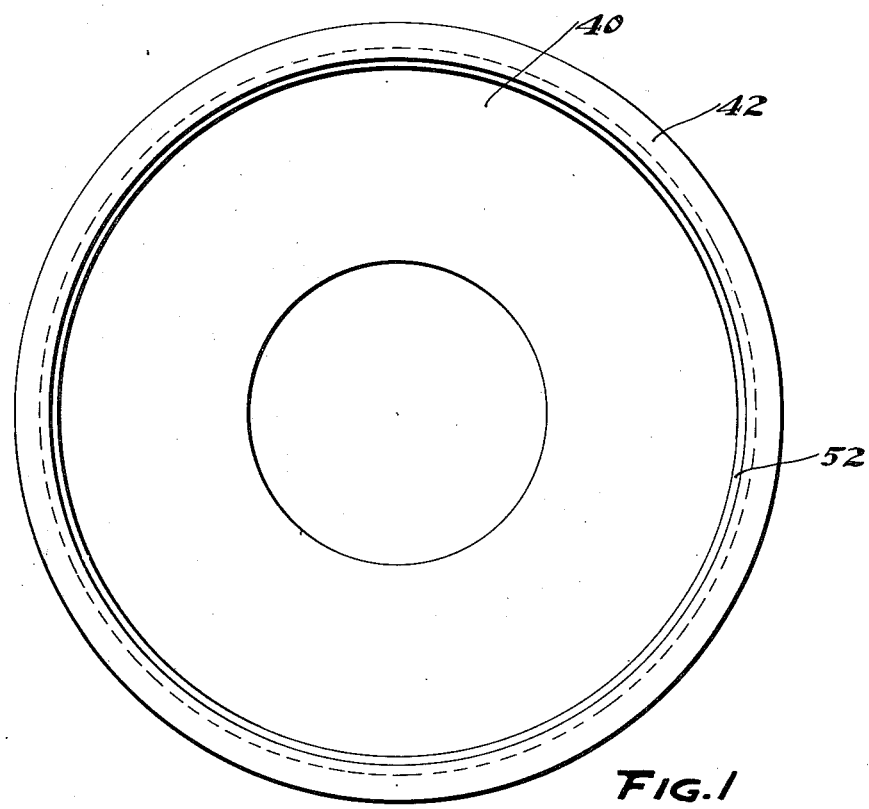
Figure 9:
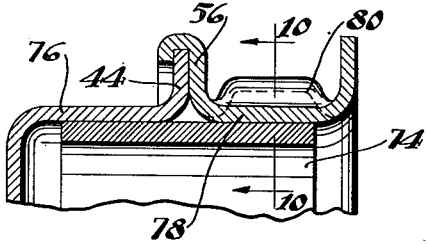
Figure 10:
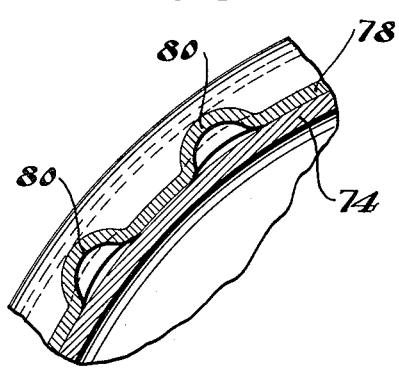
Figure 11:
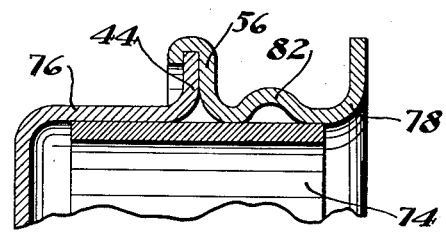
Figure 12:
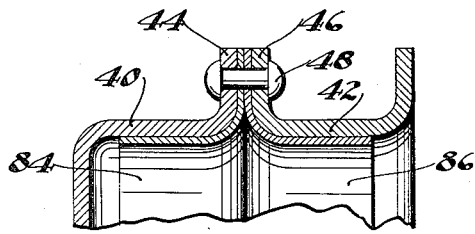
Figure 13:
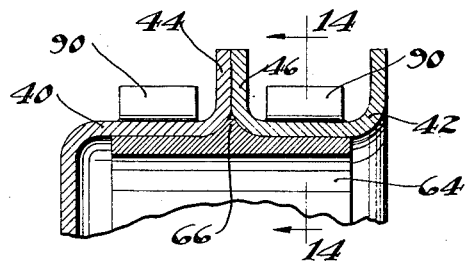
Figure 14:
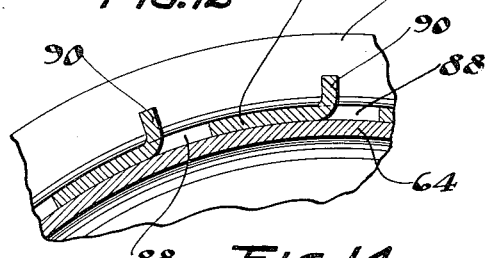

Various features of novelty relate to the relative arrangement of the above-described parts, to the means of securing them together, to the provision of novel means for facilitating the radiation of heat, and to other novel and desirable particular constructions and arrangements which will be apparent from the following description of the various embodiments illustrated in the accompanying drawings, in which:

Fig. 1 is an end elevation of a drum embodying the invention;

Figs. 2 to 9 inclusive are partial radial sections through different drums embodying different forms of the invention;

Fig. 10 is a partial section on the line 10—10 of Fig. 9;

Figs. 11, 12, and 13 are partial sections corresponding to Figs. 2 to 9, but showing different embodiments;

Fig. 14 is a partial section on the line 14—14 of Fig. 13.

Figure 2:
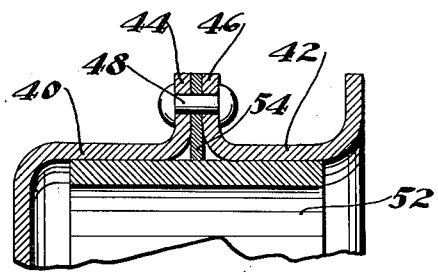
Figure 3:
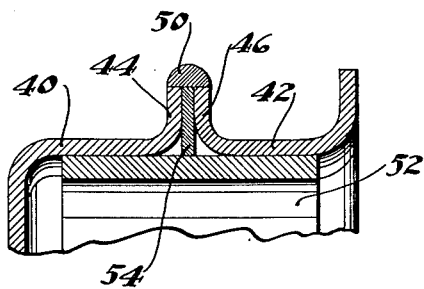

In the embodiment of Figs. 1, 2, and 3, the novel composite drum is built up of two sections 40 and 42 preferably of sheet steel, the former having the head formed integrally thereof and being generally cup-shaped, and the latter being a ring of the same diameter as the section 40 and arranged beside it and preferably having an external strengthening flange at its free edge. The sections are provided at their adjacent edges with attaching means such as flanges 44 and 46 which serve as heat dissipating means and are permanently secured together by means such as rivets 48 (Fig. 2) or a weld 50 (Fig. 3). An arc-weld is shown, although other forms of welding may be used.

Seated within the coaxial sections 40 and 42 is a novel liner 52, of cast iron or the like, arranged to bridge the joint between the sections and encircled by the two sections at its opposite sides. This liner is shown provided with an external encircling rib or flange 54, which may be a separately-formed ring welded or brazed to the liner proper, and which preferably is secured between the flanges 44 and 46 to form therewith an external strengthening and heat-radiating composite rib or flange.

Since the contact of the liner with the drum body is much poorer at the sides than it is through engagement of rib 54 with flanges 44 and 46, most of the heat will be radiated at the center (i. e. through rib 44—46—54) and there will be little tendency to distortion due to heat.

Figure 4:
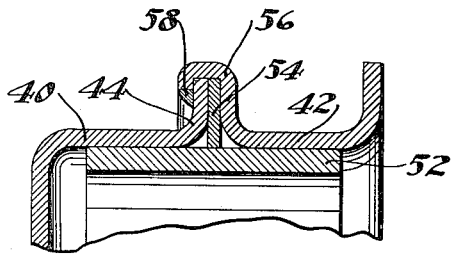

The arrangement of Fig. 4 is like that described above, except that flange 56, corresponding to the flange 46, is spun over the flange 44 and secured to the side thereof by means such as an arc-weld 58.

Figure 5:
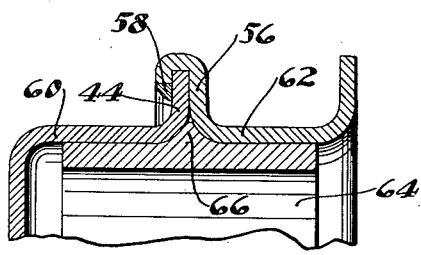

In Fig. 5, sections 60 and 62 (corresponding respectively to sections 40 and 42) are secured together as in Fig. 4, but the liner 64 is formed with a relatively low integral external rib 66 seated in the groove formed at the bases of flanges 44 and 56, to key the liner in place and aid in transferring heat.

Figure 6:
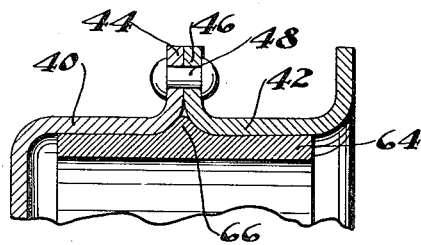
Figure 7:
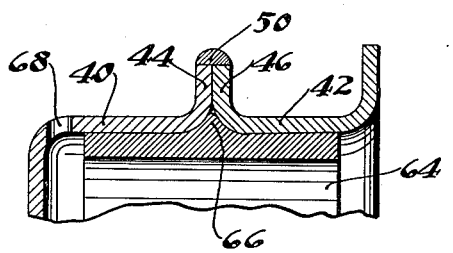

In Fig. 6, sections 40 and 42 of Fig. 2 are provided with a liner 64 formed as in Fig. 5, while in Fig. 7 this liner is seated in the drum body of Fig. 3. Openings 68 may be provided, through which water and dirt escape when the brake drum is in use.

Figure 8:
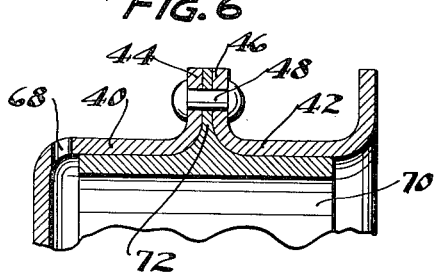

In Fig. 8 there is a drum body formed as in Fig. 2, but a liner 70 is provided having an integral rib 72 secured between the flanges 44 and 46.

Figs. 9 and 10 show a construction in which a liner 74 is pressed into a drum body formed of two sections 76 and 78 secured together as in Fig. 4, and with means such as transverse pressed grooves 80 formed in the outer section 74 to restrict the transfer of heat and cause more heat to be radiated through the headed section 76, thereby limiting or obviating undue expansion or "bell-mouth" effect at the free edge of the braking flange. As shown in Fig. 11, grooves 80 may be replaced by one or more peripheral grooves 82.

In Fig. 12, there is an arrangement similar to Fig. 2, except that the liner is in two sections 84 and 86 having superposed edge flanges secured between the flanges 44 and 46.

Figs. 13 and 14 show a construction similar to Fig. 6 or Fig. 7, except that one (or both) of the sections is formed with openings 88 through which heat is radiated directly from the liner, by punching out transverse tongues 90 which also serve to radiate heat transferred through the encircling section 40 or 42.

While a number of modifications have been described in detail, it is not our intention to limit the scope of the invention to those particular embodiments, or otherwise than by the terms of the appended claims.

We claim:

1. A brake drum ring comprising a pair of cylindrical shells having cooperating radially extending flanges, said shells being arranged with their inner surfaces in axial alignment, an inner liner positioned within the shells, and means connected with the liner and extending between said flanges for securing the liner in position.

2. A composite brake drum comprising a brake drum head having a laterally extending peripheral ring portion provided with a radially extending flange at the open edge thereof, a substantially U-shaped cylindrical shell arranged with its inner surface in axial alignment with the inner surface of said ring portion and with one of its legs adjacent but spaced from the radially extending flange at the open side of said ring portion, a wear resisting inner liner positioned within said shell with a portion extending radially outwardly between the said ring flange and the cooperating leg of the U-shaped shell, and means for rigidly connecting the shell to the ring and for securing the said wear-resisting inner liner in position.

3. A brake drum, comprising a shell consisting of a plurality of parts, a liner inside of the shell, a flange on the outside of the liner fitting between the parts of the shell, and means for securing the parts of the shell to each other.

4. A brake drum, comprising a shell consisting of a plurality of parts, a liner inside of the shell, a flange on the outside of the liner fitting between the parts of the shell, means for securing the parts of the shell to each other, and means for preventing relative rotation of the liner and shell.

5. A brake drum, comprising a base member adapted to be secured to a wheel, a retaining member, the base member and retaining member forming a shell for a liner, a liner inside the shell, a flange on the outside of the liner fitting between the base member and retaining member, and means for securing the base member and retaining member to each other.

6. A brake drum, comprising a shell consisting of a plurality of parts, a cast iron liner inside of the shell, a flange on the outside of the liner fitting between the parts of the shell, and means for securing the parts of the shell to each other.

7. A brake drum, comprising a shell consisting of a plurality of parts, a liner against which a brake is adapted to act, a flange on the liner, said flange extending between and spacing the parts of the shell from each other, and means for securing the parts of the shell to each other.

8. A brake drum, comprising a shell consisting of a plurality of parts, a liner inside of the shell, a flange on the outside of the liner, said flange extending between and spacing the parts of the shell from each other, and means for securing the parts of the shell to each other.

J HAROLD HUNT.
ANDREW S. VAN HALTEREN.